(12) United States Patent
Amino et al.

(10) Patent No.: US 9,434,861 B2
(45) Date of Patent: Sep. 6, 2016

(54) PRESSURE SENSITIVE ADHESIVE COMPOSITION AND PRESSURE SENSITIVE ADHESIVE SHEET

(75) Inventors: Yumiko Amino, Tokyo (JP); Kazue Uemura, Tokyo (JP); Yoshitomo Ono, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 267 days.

(21) Appl. No.: 14/006,497

(22) PCT Filed: Mar. 21, 2012

(86) PCT No.: PCT/JP2012/057229
§ 371 (c)(1),
(2), (4) Date: Nov. 27, 2013

(87) PCT Pub. No.: WO2012/128293
PCT Pub. Date: Sep. 27, 2012

(65) Prior Publication Data
US 2014/0077139 A1    Mar. 20, 2014

(30) Foreign Application Priority Data
Mar. 24, 2011    (JP) ................................. 2011-065826

(51) Int. Cl.
*C08K 5/45* (2006.01)
*C09J 123/22* (2006.01)
(Continued)

(52) U.S. Cl.
CPC ................ *C09J 7/0214* (2013.01); *C09J 9/00* (2013.01); *C09J 123/22* (2013.01); *C09J 123/283* (2013.01); *C08K 5/0041* (2013.01); *C08K 5/45* (2013.01)

(58) Field of Classification Search
CPC ...................................................... C09J 123/22
See application file for complete search history.

(56) References Cited

U.S. PATENT DOCUMENTS 3,293,684 A * 12/1966 Tundermann ............ A47K 7/03
                                                       15/104.94
4,171,980 A * 10/1979 Ceintrey ................. G03C 1/685
                                                          427/145

(Continued)

FOREIGN PATENT DOCUMENTS

CA        1285276 C   *  6/1991  ................ C09F 1/04
JP        56-75856 A     6/1981

(Continued)

OTHER PUBLICATIONS deVan (530.11 Product Data and MSDS. deVan Sealants Inc. 2012, 6 pages).*

(Continued)

*Primary Examiner* — Brieann R Fink
(74) *Attorney, Agent, or Firm* — Oblon, McClelland, Maier & Neustadt, L.L.P.

(57) ABSTRACT

A pressure-sensitive adhesive composition containing a pressure-sensitive adhesive that contains from 40 to 95% by mass of a rubber-based resin not containing a styrene-derived constituent unit, and a photochromic dye of a dithienylethene-based compound, wherein the content of the photochromic dye is from 0.40 to 8.00 parts by mass relative to 100 parts by mass of the pressure-sensitive adhesive, and a pressure-sensitive adhesive sheet having a pressure-sensitive adhesive layer formed of the pressure-sensitive adhesive composition have excellent weather resistance that can withstand long-term use, a relatively rapid rate of color change from colored to colorless, and excellent peelability to release sheets.

14 Claims, 1 Drawing Sheet

(51) Int. Cl.
*C09J 7/02* (2006.01)
*C09J 123/28* (2006.01)
*C09J 9/00* (2006.01)
*C08K 5/00* (2006.01)

(56) References Cited

U.S. PATENT DOCUMENTS

| | | | |
|---|---|---|---|
| 4,797,322 A | | 1/1989 | Huddleston et al. |
| 5,013,785 A | * | 5/1991 | Mizui .................... C09J 201/00 156/334 |
| 6,123,952 A | * | 9/2000 | Lagrange ................. A61K 8/49 424/400 |
| 7,655,366 B2 | * | 2/2010 | Kazmaier .............. B41M 5/284 430/19 |

FOREIGN PATENT DOCUMENTS

| | | |
|---|---|---|
| JP | 2-686 A | 1/1990 |
| JP | 2-33002 | 3/1990 |
| JP | 9-32439 | 2/1997 |
| JP | 9-227845 | 9/1997 |
| JP | 10-39134 | 2/1998 |
| JP | 10-330708 | 12/1998 |
| JP | 2001-209039 | 8/2001 |
| JP | 2002-371162 A | 12/2002 |
| JP | 2004-149501 A | 5/2004 |

OTHER PUBLICATIONS

Machine translated English language equivalent of JP 09-227845 (Sep. 1997, 3 pages).*
Machine translated English language equivalent of JP 10-330708 (Dec. 1998, 3 pages).*
Combined Taiwanese Office Action and Search Report issued Jun. 9, 2015 in Patent Application No. 101109988 (with English translation of categories of cited documents).
Combined Chinese Office Action and Search Report issued May 6, 2015 in Patent Application No. 201280014818.8 (with English Translation of Category of Cited Documents).
Qian-Fu Luo, et al., "A Survey on the Synthesis of Photochromic Material Diarylethenes", Chinese Journal of Organic Chemistry, vol. 27, No. 2, (2007), pp. 175, 180-181 (with English abstract).
International Search Report issued Jun. 12, 2012 in PCT/JP2012/057229 filed Mar. 21, 2012.
Japanese Office Action issued Nov. 17, 2015 in Patent Application No. 2013-505991 (with English Translation).

* cited by examiner

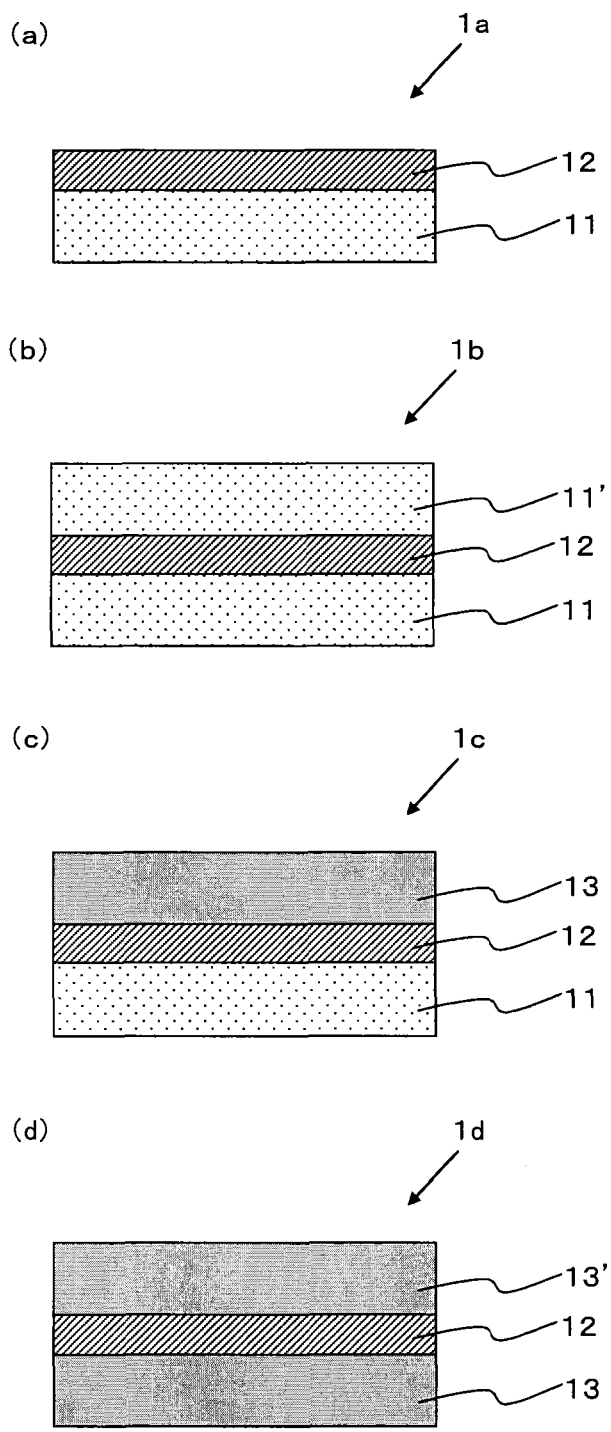

PRESSURE SENSITIVE ADHESIVE COMPOSITION AND PRESSURE SENSITIVE ADHESIVE SHEET

TECHNICAL FIELD

The present invention relates to a reversibly color-changeable, light-transmissive, pressure-sensitive adhesive composition, and to a pressure-sensitive adhesive sheet having a pressure-sensitive adhesive layer formed of the pressure-sensitive adhesive composition.

BACKGROUND ART

Heretofore, for glass plates and transparent resin plates for windowpanes, wall surfaces, partitions, or for illuminations to be used in space exposed to black light irradiation, a color sheet has been proposed for use for light transmission control. However, use of such a color sheet, as stuck to windowpanes of ordinary constructions, involves a problem in that the quantity of external light that would pass through the sheet in rainy or cloudy days or during evening hours is small and therefore sufficient brightness could not be secured inside the constructions.

Recently, for solving the problem, a color sheet using a photochromic dye has been proposed (see PTL 1 to 4). The photochromic dye reversibly changes the color thereof depending on light irradiation. In other words, the dye has a characteristic of such that it colors when irradiated with sunlight or UV rays such as black light or the like, but on the other hand, it gets back to be colorless in the environment not exposed to UV rays.

The color sheet disclosed in PTL 1 to 4 uses a photochromic dye having such a characteristic, and therefore it is said that the sheet can block light in the environment exposed to UV rays, but is transparent in the other environments.

CITATION LIST

Patent Literature

PTL 1: JP-UM-A 2-33002
PTL 2: JP-A 9-32439
PTL 3: JP-A 10-39134
PTL 4: JP-UM-B 3-36236

SUMMARY OF INVENTION

Technical Problem

However, when the color sheet disclosed in PTL 1 to 4 is used for a long period of time, the chromogenicity of the dye therein lowers and therefore the sheet is problematic in point of the weather resistance thereof in that, for example, the sheet would discolor in the absence of UV irradiation in which the sheet should be naturally transparent. In addition, the sheet has other problems in that the speed of color change thereof from colored to colorless is low and, further, depending on the dye to be used therein, it would be difficult to peel a release sheet from the sheet having the release sheet.

The present invention has been made for the purpose of solving the above-mentioned problems, and its object is to provide a pressure-sensitive adhesive composition and a pressure-sensitive adhesive sheet having excellent weather resistance that can withstand long-term use, a relatively rapid rate of color change from colored to colorless, and excellent peelability to release sheets.

Solution to Problem

The present inventors have found that a pressure-sensitive adhesive composition that contains a pressure-sensitive adhesive containing a predetermined amount of a specific rubber-based resin, and a specific photochromic dye in a predetermined ratio can solve the above-mentioned problems.

Specifically, the present invention provides the following [1] to [6].

[1] A pressure-sensitive adhesive composition containing a pressure-sensitive adhesive that contains from 40 to 95% by mass of a rubber-based resin not containing a styrene-derived constituent unit, and a photochromic dye of a dithienylethene-based compound, wherein the content of the photochromic dye is from 0.40 to 8.00 parts by mass relative to 100 parts by mass of the pressure-sensitive adhesive.

[2] The pressure-sensitive adhesive composition according to the above [1], wherein the dithienylethene-based compound is a compound having two aryl groups and/or (a) hexafluorocyclopentene group(s) in the structure of one molecule.

The pressure-sensitive adhesive composition according to the above [1] or [2], which contains a polyisobutylene-based resin as the rubber-based resin and in which the content of the polyisobutylene-based resin is from 60 to 100% by mass in the rubber-based resin.

[4] The pressure-sensitive adhesive composition according to any of the above [1] to [3], wherein the pressure-sensitive adhesive further contains a tackifier and the content of the tackifier is from 5 to 60% by mass of all the components of the pressure-sensitive adhesive.

[5] A pressure-sensitive adhesive sheet having a pressure-sensitive adhesive layer formed of the pressure-sensitive adhesive composition of any of the above [1] to [4].

Advantageous Effects of Invention

The pressure-sensitive adhesive composition and the pressure-sensitive adhesive sheet of the present invention have excellent weather resistance that can withstand long-term use, a relatively rapid rate of color change from colored to colorless, and excellent peelability to release sheets.

BRIEF DESCRIPTION OF DRAWING

FIG. 1 This includes cross-sectional views of showing one example of the configuration of the pressure-sensitive adhesive sheet of the present invention.

DESCRIPTION OF EMBODIMENTS

Pressure-Sensitive Adhesive Composition

Containing a pressure-sensitive adhesive that contains from 40 to 95% by mass of a rubber-based resin not containing a styrene-derived constituent unit, and a photochromic dye of a dithienylethene-based compound in a predetermined ratio relative to the pressure-sensitive adhesive, the pressure-sensitive adhesive composition of the present invention can be a pressure-sensitive adhesive composition that exhibits the above-mentioned advantageous effects.

In addition, the pressure-sensitive adhesive composition of the present invention may further contain any other additive such as an antioxidant, a UV absorbent, etc.

The pressure-sensitive adhesive, the photochromic dye, the antioxidant and other additives to be contained in the pressure-sensitive adhesive composition of the present invention are described in detail hereinafter.

[Pressure-Sensitive Adhesive]

The pressure-sensitive adhesive composition of the present invention contains, as the pressure-sensitive adhesive therein, a rubber-based resin not containing a styrene-derived constituent unit, in which, therefore, the photochromic dye could be prevented from being brought into contact with water to lower the photochromic capability thereof, and the weather resistance of the pressure-sensitive adhesive composition could be thereby bettered.

In other words, in case where a rubber-based resin that contains a styrene-derived constituent unit is used as the pressure-sensitive adhesive, it is considered that the photochromic dye would be kept in contact with water to lower the photochromic capability thereof, and therefore the weather resistance in long-term use of the pressure-sensitive adhesive composition to be obtained would greatly worsen.

In the present invention, the content of the rubber-based resin not containing styrene as the constituent unit therein is from 40 to 95% by mass of all the components of the pressure-sensitive adhesive, but preferably from 50 to 90% by mass, more preferably from 65 to 85% by mass, even more preferably from 70 to 80% by mass. When the content is less than 40% by mass, it is unfavorable since zipping would readily occur. On the other hand, when more than 95% by mass, it is also unfavorable since the pressure-sensitive adhesive force of the pressure-sensitive adhesive sheet tends to lower.

(Rubber-Based Resin)

Not specifically defined, the rubber-based resin may be any one not containing a styrene-derived constituent unit. "Not containing a styrene-derived constituent unit" means that a styrene-derived constituent unit is not intentionally incorporated in the constituent unit of the rubber-based resin to be used here. Even in a case where the rubber-based resin may contain the constituent unit as an impurity, the content of the styrene-derived constituent unit in all the constituent units of the rubber-based resin is generally less than 0.1% by mass, preferably less than 0.01% by mass, more preferably less than 0.001% by mass, and even more preferably the content is substantially 0% by mass.

As the rubber-based resin, for example, usable is a synthetic rubber-based such as polyisobutylene-based resin, polybutene-based resin or the like, or a natural rubber. Of those, preferred are a polyisobutylene-based resin and a natural rubber; and more preferred is a polyisobutylene-based resin.

The polyisobutylene-based resin includes, for example, an isobutylene homopolymer of polyisobutylene, copolymers of isobutylene and isoprene, isobutylene and n-butene, isobutylene and butadiene, as well as halogenated copolymers prepared by brominating or chlorinating these copolymers, etc. In the copolymers, the content of the constituent unit of isobutylene is the largest of all the constituent units. Of those, preferred is an isobutylene homopolymer of polyisobutylene.

The polyisobutylene-based resin content is, from the viewpoint of improving the weather resistance of the pressure-sensitive adhesive composition to be obtained here, preferably from 60 to 100% by mass in the rubber-based resin, more preferably from 80 to 100% by mass, even more preferably from 95 to 100% by mass, but further more preferably, the content is substantially 100% by mass.

The weight-average molecular weight of the rubber-based resin is preferably at least 20,000, more preferably from 50,000 to 6,000,000, even more preferably from 100,000 to 1,200,000, still more preferably from 150,000 to 500,000, from the viewpoint of enhancing the cohesion force of the pressure-sensitive adhesive composition to thereby prevent adherends from being contaminated.

In the present invention, the value of weight-average molecular weight means a polystyrene-equivalent value measured through gel permeation chromatography (GPC).

In case where a polyisobutylene-based resin is used as the rubber-based resin, preferred is a combination of a polyisobutylene-based resin having a large weight-average molecular weight (hereinafter this may be referred to as "PIB-based resin (A)") and a polyisobutylene-based resin having a smaller weight-average molecular weight than that of the PIB-based resin (A) (hereinafter this may be referred to as "PIB-based resin (B)").

In the combination of such a PIB-based resin (A) and a PIB-based resin (B) that differ in point of the weight-average molecular weight thereof, the PIB-based resin (A) and the PIB-based resin (B) are well miscible with each other and the PIB-based resin (A) could be thereby suitably plasticized to enhance the wettability for adherends, and as a result, it is considered that using the combination could enhance the adhesiveness, the flexibility and the retentivity of the pressure-sensitive adhesive composition to be obtained here.

The weight-average molecular weight of the PIB-based resin (A) is preferably from 300,000 to 500,000, more preferably from 320,000 to 480,000, even more preferably from 330,000 to 450,000, from the viewpoint of the balance among the cohesion force, the flexibility and the flowability of the pressure-sensitive adhesive composition.

When the weight-average molecular weight is at least 300,000, then the cohesion force of the pressure-sensitive adhesive composition could be sufficient to prevent adherends from being contaminated. When at most 500,000, then the pressure-sensitive adhesive composition could have both suitable flexibility and flowability and the solubility thereof in solvent would be good.

The weight-average molecular weight of the PIB-based resin (B) is preferably from 1,000 to 280,000, more preferably from 5,000 to 250,000, even more preferably from 10,000 to 220,000, from the viewpoint of being well compatible with the PIB-based resin (A) to suitably plasticize the PIB-based resin (A).

When the weight-average molecular weight is at least 1,000, then the PIB-based resin (B) could be prevented from being separated as a low-molecular weight component to contaminate adherends. When the weight-average molecular weight is at most 280,000, then the PIB-based resin (A) could be sufficiently plasticized to enhance the adhesiveness, the flexibility and the retentivity of the pressure-sensitive adhesive composition to be obtained here The content of the PIB-based resin (B) is preferably from 2 to 100 parts by mass relative to 100 parts by mass of the PIB-based resin (A), more preferably from 6 to 100 parts by mass, even more preferably from 10 to 100 parts by mass, from the viewpoint of the balance between the pressure-sensitive adhesion force and the cohesion force.

When the content of the PIB-based resin (B) is at least 2 parts by mass, then the PIB-based resin (A) could be well plasticized and could have increased wettability for adherends, and the adhesiveness, the flexibility and the retentivity of the pressure-sensitive adhesive composition to be obtained here could be thereby improved. When at most 100 parts by mass, then the cohesion force of the pressure-sensitive adhesive composition would be sufficient to prevent adherends from being contaminated.

(Tackifier)

Preferably, the pressure-sensitive adhesive for use in the present invention further contains a tackifier from the viewpoint of improving the pressure-sensitive adhesion force of the pressure-sensitive adhesive composition to be obtained here.

Any known tackifier is usable, but from the viewpoint of bettering the weather resistance of the pressure-sensitive adhesive composition to be obtained here and maintaining the photochromic performance of the composition, preferred is a hydrogenated petroleum resin.

In the present invention, the hydrogenated petroleum resin means one prepared by hydrogenating a petroleum resin such as an aliphatic-based petroleum resin, a cyclopentadiene-based petroleum resin or the like by the use of a hydrogenation catalyst.

The hydrogenated petroleum resin includes, for example, hydrogenated terpene-based resin, hydrogenated rosin-based and hydrogenated rosin ester-based resin, disproportionated rosin, disproportionated rosin ester-based resin; hydrogenated dicyclopentadiene-based resin and partially-hydrogenated aromatic-modified dicyclopentadiene-based resin, which are hydrogenated resins of C5-based petroleum resins to be obtained through copolymerization of C5 fraction such as pentene, isoprene, piperine, 1,3-pentadiene or the like that forms through thermal cracking of petroleum naphtha; resin produced through hydrogenation of C9-based petroleum resin that forms through copolymerization of C9 fraction such as indene, vinyltoluene, α- or β-methylstyrene or the like to form through thermal cracking of petroleum naphtha; resin produced through hydrogenation of copolymerized petroleum resin of the above-mentioned C5 fraction and C9 fraction, etc.

The content of the tackifier is preferably from 5 to 60% by mass in all the components of the pressure-sensitive adhesive, more preferably from 10 to 50% by mass, even more preferably from 15 to 35% by mass, still more preferably from 20 to 30% by mass. When the content thereof is at least 5% by mass, then the pressure-sensitive adhesive composition to be obtained here could be given sufficient pressure-sensitive adhesion force. When at most 60% by mass, then the pressure-sensitive adhesive composition to be obtained here could have sufficient flexibility and could prevent zipping.

(Other Component)

The pressure-sensitive adhesive for use in the present invention may contain any other component within a range not detracting from the advantageous effects of the present invention. The other component includes a pressure-sensitive adhesion force/retentivity controlling agent such as liquid paraffin, vegetable oil (e.g., olive oil, soybean oil, beef tallow, lard), polybutene, lower isoprene, wax, etc.

[Photochromic Dye]

The pressure-sensitive adhesive composition of the present invention contains a photochromic dye of a dithienylethene-based compound.

In the present invention, the dithienylethene-based compound means a compound having two double bonds and two thienyl groups in the structure of one molecule. The compound may have the two double bonds in any moiety inside the chain structure or the ring structure thereof. The thienyl group may have a substituent such as an alkyl group, a cycloalkyl group, an aryl group, etc.

The dithienylethene-based compound includes, for example, 1,2-bis(2,4-dimethyl-5-phenyl-3-thienyl)-3,3,4,4,5,5-hexafluoro-1-cyclopentene (commercial product; product name "B2629", by Tokyo Chemical Industry Co., Ltd. (the same shall apply hereinafter)), 1,2-bis[2-methylbenzo[b]thiophen-3-yl]-3,3,4,4,5,5-hexafluoro-1-cyclopentene (commercial product; "B2287"), 2,3-bis(2,4,5-trimethyl-3-thienyl)maleic anhydride (commercial product; "B1534"), cis-1,2-dicyano-1,2-bis(2,4,5-trimethyl-3-thienyl)ethene (commercial product; "B1536"), 2,3-bis(2,4,5-trimethyl-3-thienyl)maleimide (commercial product; "B1535"), etc.

One alone or two or more different types of those dithienylethene-based compounds may be used here either singly or as combined.

Of the dithienylethene-based compounds, preferred are those having two aryl groups and/or (a) hexafluorocyclopentene group(s) in the structure of one molecule, more preferred are those having two aryl groups and (a) hexafluorocyclopentene group(s), and even more preferred are those having two benzothienyl groups and (a) hexafluorocyclopentene group(s) from the viewpoint of obtaining the pressure-sensitive adhesive composition excellent in weather resistance even in long-term use.

The compounds of those types include, for example, 1,2-bis(2,4-dimethyl-5-phenyl-3-thienyl)-3,3,4,4,5,5-hexafluoro-1-cyclopentene, 1,2-bis[2-methylbenzo[b]thiophen-3-yl]-3,3,4,4,5,5-hexafluoro-1-cyclopentene, etc. Preferred is a compound having benzothienyl groups, such as 1,2-bis[2-methylbenzo[b]thiophen-3-yl]-3,3,4,4,5,5-hexafluoro-1-cyclopentene.

The content of the photochromic dye of a dithienylethene-based compound is from 0.40 to 8.00 parts by mass relative to 100 parts by mass of the pressure-sensitive adhesive, and is preferably from 0.43 to 7.00 parts by mass, more preferably from 0.45 to 6.00 parts by mass, even more preferably from 0.47 to 5.00 parts by mass, still more preferably from 0.50 to 3.50 parts by mass.

When the content is less than 0.40 parts by mass, then it is unfavorable since the photochromic capability could not be sufficiently exhibited. On the other hand, when more than 8.00 parts by mass, then the weather resistance of the pressure-sensitive adhesive composition to be obtained here would be poor and the rate of color change from colored to colorless would be low. In addition, such is also unfavorable since the outward appearance of the pressure-sensitive adhesive layer of the pressure-sensitive adhesive sheet to be formed of the pressure-sensitive adhesive composition would whiten and worsen.

[Antioxidant]

The pressure-sensitive adhesive composition of the present invention may further contain an antioxidant. The antioxidant, if any in the pressure-sensitive adhesive composition of the present invention, does not detract from the photochromic capability of the composition. Containing such an antioxidant, the pressure-sensitive adhesive composition could be more excellent in resistance to high wet heat.

The antioxidant is preferably a hindered phenol-based antioxidant from the viewpoint of improving the resistance to high wet heat of the pressure-sensitive adhesive composition to be obtained here.

The hindered phenol-based antioxidant includes, for example, triethylene glycol bis[3-(3-t-butyl-5-methyl-4-hydroxyphenyl)propionate], 1,6-hexanediol bis[3-(3,5-di-t-butyl-4-hydroxyphenyl)propionate], pentaerythrityl tetrakis[3-(3,5-di-t-butyl-4-hydroxyphenyl)propionate], 2,2-thiodiethylenebis[3-(3,5-di-t-butyl-4-hydroxyphenyl) propionate], octadecyl 3-(3,5-di-t-butyl-4-hydroxyphenyl)

propionate, N,N'-hexamethylenebis(3,5-di-t-butyl-4-hydroxy-hydroxycinnamide), 1,3,5-trimethyl-2,4,6-tris(3,5-di-t-butyl-4-hydroxybenzyl)benzene, tris(3,5-di-t-butyl-4-hydroxybenzyl)isocyanurate, 2,4-bis(n-octylthio)-6-(4-hydroxy-3,5-di-t-butylanilino)-1,3,5-triazine, 2,4-bis[(octylthio)methyl]-o-cresol, 2,6-di-t-butyl-p-cresol, 4,4'-butylidenebis(6-t-butyl-3-methylphenol), 2,2'-methylenebis(4-methyl-6-t-butylphenol), 2,2'-methylenebis(4-ethyl-6-t-butylphenol), 2,6-di-t-butyl-4-ethylphenol, 1,1,3-tris(2-methyl-4-hydroxy-5-t-butylphenyl)butane, 1,3,5-tris(3,5-di-t-butyl-4-hydroxybenzyl)-1,3,5-triazine-2,4,6(1H,3H,5H)trione, isooctyl (3,5-di-t-butyl-4-hydroxyphenyl)propionate, 1,6-hexanediol bis[3-(3,5-di-t-butyl-4-hydroxyphenyl)propionate], pentaerythrityl tetrakis[3-(3,5-di-t-butyl-4-hydroxyphenyl)propionate], 2,2-thio-diethylenebis[3-(3,5-di-t-butyl-4-hydroxyphenyl)propionate], octadecyl 3-(3,5-di-t-butyl-4-hydroxyphenyl)propionate, N,N'-hexamethylenebis(3,5-di-t-butyl-4-hydroxy-hydroxycinnamide), 1,3,5-trimethyl-2,4,6-tris(3,5-di-t-butyl-4-hydroxybenzyl)benzene, tris-(3,5-di-t-butyl-4-hydroxybenzyl)isocyanurate, 2,4-bis(n-octylthio)-6-(4-hydroxy-3,5-di-t-butylanilino)-1,3,5-triazine, 2,6-di-t-butyl-p-cresol, 2,6-di-t-butyl-4-ethylphenol, 1,3,5-tris(3,5-di-t-butyl-4-hydroxybenzyl)-1,3,5-triazine-2,4,6(1H,3H,5H)trione, isooctyl (3,5-di-t-butyl-4-hydroxyphenyl)propionate, etc.

Of those, preferred is a hindered phenol-based antioxidant having a branched alkyl group, and more preferred is a hindered phenol-based antioxidant in which the two beta positions of the hindered phenol group each are substituted with a t-butyl group, from the viewpoint of improving the resistance to high wet heat of the pressure-sensitive adhesive composition.

The hindered phenol-based antioxidant in which the two beta positions of the hindered phenol group each are substituted with a t-butyl group is especially excellent in the ability of antioxidant to enhance durability in use for long-term operation or in use in outdoor operation environments.

The antioxidant of the above type includes, for example, 1,6-hexanediol bis[3-(3,5-di-t-butyl-4-hydroxyphenyl)propionate], pentaerythrityl tetrakis[3-(3,5-di-t-butyl-4-hydroxyphenyl)propionate], 2,2-thio-diethylenebis[3-(3,5-di-t-butyl-4-hydroxyphenyl)propionate], octadecyl 3-(3,5-di-t-butyl-4-hydroxyphenyl)propionate, N,N'-hexamethylenebis(3,5-di-t-butyl-4-hydroxy-hydroxycinnamide), 1,3,5-trimethyl-2,4,6-tris(3,5-di-t-butyl-4-hydroxybenzyl)benzene, tris-(3,5-di-t-butyl-4-hydroxybenzyl)isocyanurate, 2,4-bis-(n-octylthio)-6-(4-hydroxy-3,5-di-t-butylanilino)-1,3,5-triazine, 2,6-di-t-butyl-p-cresol, 2,6-di-t-butyl-4-ethylphenol, 1,3,5-tris(3,5-di-t-butyl-4-hydroxybenzyl)-1,3,5-triazine-2,4,6(1H,3H,5H)trione, isooctyl (3,5-di-t-butyl-4-hydroxyphenyl)propionate, etc.

Commercial products of antioxidant include YOSHINOX BHT (by API Corporation), IRGANOX 565 (by BASF Ltd.), IRGANOX 1010 (by BASF Ltd.), etc.

The content of the antioxidant is preferably from 0.01 to 1.0 part by mass relative to 100 parts by mass of the pressure-sensitive adhesive, more preferably from 0.03 to 0.5 parts by mass, even more preferably from 0.04 to 0.3 parts by mass, from the viewpoint of improving the resistance to high wet heat of the pressure-sensitive adhesive composition to be obtained here. When the content is at least 0.01 parts by mass, then the durability of pressure-sensitive adhesive composition to be obtained here could be fully enhanced. On the other hand, when at most 1.0 part by mass, then the phenomenon that the antioxidant would separate from the other components to deposit could be prevented.

[Other Additive]

The pressure-sensitive adhesive composition of the present invention may further contain any other additive within a range not detracting from the advantageous effects of the present invention and not interfering with the properties such as the pressure-sensitive adhesion force and others of the composition.

The other additive includes, for example, UV absorbent, light stabilizer, resin stabilizer, IR/near IR absorbent, antiseptic/fungicide, freezing and thawing stabilizer, corrosion inhibitor, plasticizer, high-boiling-point solvent, filler, pigment, extender, etc. One alone or two or more different types of these additives may be used here either singly or as combined.

The UV absorbent includes, for example, hindered amine-based compounds, benzotriazole-based compounds, oxazoliac acid amide compounds, benzophenone-based compounds, etc. As commercial products, there are mentioned Tinuvin 765 (by BASF Ltd., hindered amine-based compound), etc.

The content of the UV absorbent is preferably from 0.01 to 3.0 parts by mass relative to 100 parts by mass of the pressure-sensitive adhesive, more preferably from 0.03 to 2.0 parts by mass, even more preferably from 0.04 to 1.0 part by mass.

The light stabilizer includes, for example, hindered amine-based light stabilizer, benzophenone-based light stabilizer, benzotriazole-based light stabilizer, etc.

The content of the light stabilizer is preferably from 0.01 to 2 parts by mass relative to 100 parts by mass of the pressure-sensitive adhesive.

The resin stabilizer includes, for example, imidazole-based resin stabilizer, dithiocarbamic acid salt-based resin stabilizer, phosphorus-containing resin stabilizer, sulfur ester-based resin stabilizer, etc.

The content of the resin stabilizer is preferably from 0.01 to 3 parts by mass relative to 100 parts by mass of the pressure-sensitive adhesive.

[Pressure-Sensitive Adhesive Sheet]

The pressure-sensitive adhesive sheet of the present invention has a pressure-sensitive adhesive layer formed of the pressure-sensitive adhesive composition of the present invention. The configuration of the pressure-sensitive adhesive sheet of the present invention is not specifically defined. The configuration is not limited to the pressure-sensitive adhesive sheet 1a shown in FIG. 1(a), having the pressure-sensitive adhesive layer 12 formed on the substrate 11.

For example, there are mentioned the pressure-sensitive adhesive sheet 1b shown in FIG. 1(b), having the pressure-sensitive adhesive layer 12 formed on the substrate 11 and additionally having another substrate 11' formed on the layer; the pressure-sensitive adhesive sheet 1c shown in FIG. 1(c), having the pressure-sensitive adhesive layer 12 formed on the substrate 11 and having a peelable release material 13 formed on the layer. In the pressure-sensitive adhesive sheet 1b, the substrates 11 and 11' may be the same type or different types. In addition, for example, the pressure-sensitive adhesive sheet 1b may be used as a substrate, and another pressure-sensitive adhesive layer may be further laminated thereon to give a pressure-sensitive adhesive sheet in which the pressure-sensitive adhesive layer is sandwiched between the substrates and which therefore has further improved weather resistance.

The pressure-sensitive adhesive sheet 1d shown in FIG. 1(d) is further mentioned, in which the pressure-sensitive adhesive layer 12 is sandwiched between the peelable release material 13 and another peelable release material 13' with no substrate therein. In the pressure-sensitive adhesive sheet 1d, the peelable release materials 13 and 13' may be the same type or different types, but preferably the two are so controlled that the peel force of the peelable release material 13 differs from that of the peelable release material 13'.

The thickness of the pressure-sensitive adhesive layer of the pressure-sensitive adhesive sheet may be suitably determined depending on the use thereof, but is preferably from 0.5 to 100 µm, more preferably from 1 to 60 µm, even more preferably from 3 to 40 µm. When the thickness is at least 0.5 µm, then the sheet secures good adhesion force to adherends; and when at most 100 µm, then it is advantageous in point of the production efficiency and the pressure-sensitive adhesive sheet can be easy to handle.

(Substrate)

Not specifically defined, the substrate for use in the pressure-sensitive adhesive sheet of the present invention may be suitably selected in accordance with the intended use of the pressure-sensitive adhesive sheet.

The substrate includes, for example, paper substrates such as high-quality paper, art paper, coated paper, glassine paper, etc.; other various paper substrates such as laminated paper substrates and the like produced by laminating a thermoplastic resin such as polyethylene or the like on the above-mentioned paper substrates; various synthetic paper substrates; metal foils such as aluminium foil, copper foil, iron foil, etc.; porous material substrates such as nonwoven fabric, etc.; plastic films or plastic sheets of resins such as polyolefin resins, e.g., polyethylene resin, polypropylene resin, etc., polyester resins, e.g., polybutylene terephthalate resin, polyethylene terephthalate resin, etc., acetate resins, ABS resins, polystyrene resins, vinyl chloride resins, etc., and their mixtures or laminates, etc. The substrates of plastic films or plastic sheets may be unstretched, or may be stretched monoaxially or biaxially, for example, in the machine direction or in the lateral direction.

The substrate to be used here is not specifically defined in point of the presence or absence of coloration thereof, but preferred is a substrate that can sufficiently transmit UV rays, and more preferred is a substrate that is colorless and transparent even in a visible light region.

The substrate may contain a UV absorbent, a light stabilizer, an antioxidant, an antistatic agent, a slip agent, an antiblocking agent, a colorant, etc.

The surface or the back of the substrate may be printed with patterns, letters or the like. For this, the substrate may be provided with a thermal recording layer, a printed image-receiving layer for thermal transfer, inkjet printing, laser printing or the like, a printability improving layer, etc. The pressure-sensitive adhesive sheet that uses an opaque substrate printed with patterns, letters or the like may be used in cases where the printed face is observed via the pressure-sensitive adhesive layer of the pressure-sensitive adhesive sheet.

In case where the substrate is formed of a plastic material, it is desirable to optionally process the surface of the substrate for surface treatment according to an oxidation method, a roughening method or the like for the purpose of improving the adhesiveness between the substrate and the pressure-sensitive adhesive layer.

Not specifically defined, the oxidation method includes, for example, a corona discharge treatment method, a plasma treatment method, chromic acid oxidation (wet treatment), flame treatment, hot air treatment, ozone/UV irradiation treatment, etc. Also not specifically defined, the roughening method includes, for example, a sandblasting method, a solvent treatment method, etc. These surface treatments may be suitably selected depending on the type of the substrate, but preferred is a corona discharge treatment method from the viewpoint of the effect to improve the adhesiveness to the pressure-sensitive adhesive layer and of the operability. Primer treatment may be given to the substrate.

Also if desired, a filling-up layer may be provided between the substrate and the pressure-sensitive adhesive layer, depending on the type of the substrate. The filling-up layer may be provided for further improving the adhesiveness between the substrate and the pressure-sensitive adhesive layer, in addition to the purpose for preventing the pressure-sensitive adhesive layer from penetrating into the substrate, or in case where the substrate is paper and is too labile, the filling-up layer may be provided for stiffening the substrate.

Not specifically defined, the filling-up layer may be a layer of a resin composition comprising, for example, a styrene-butadiene copolymer, an acrylic-based resin, a polyester-based resin, a polyurethane-based resin, a polystyrene-based resin or the like as the main component, and optionally containing a filler such as clay, silica, calcium carbonate, titanium oxide, zinc oxide or the like added thereto.

Not specifically defined, the thickness of the filling-up layer is generally within a range of from 0.1 to 30 µm.

Also not specifically defined, the thickness of the substrate is generally from 10 to 250 µm but is preferably from 15 to 200 µm, more preferably from 20 to 150 µm from the viewpoint of the handleability thereof.

(Release Material)

The release material includes one produced by coating a substrate for release material with a release agent. Concretely, herein usable are a release sheet processed for release treatment on both surfaces thereof, and a release sheet processed for release treatment on one surface thereof.

The substrate for release material includes, for example, paper substrates such as glassine paper, coated paper, high-quality paper, etc.; laminated paper substrates produced by laminating a thermoplastic resin such as polyethylene or the like on these paper substrates; plastic films such as polyester resin films of polyethylene terephthalate resin, polybutylene terephthalate resin, polyethylene naphthalate resin or the like, polyolefin resin films of polypropylene resin, polyethylene resin or the like, etc.

The release agent includes, for example, rubber-based elastomers such as silicone-based resin, olefinic-based resin, isoprenic-based resin, butadienic-based resin, etc.; long-chain alkyl-based resins, alkyd-based resins, fluoro-based resins, etc.

Not specifically defined, the thickness of the release material is generally from 20 to 200 µm but is preferably from 25 to 150 µm.

(Production Method for Pressure-Sensitive Adhesive Sheet)

The production method for the pressure-sensitive adhesive sheet of the present invention is not specifically defined. For example, there is mentioned a method for producing the pressure-sensitive adhesive sheet, which comprises adding an organic solvent such as toluene, ethyl acetate, methyl ethyl ketone or the like to the pressure-sensitive adhesive composition of the present invention to prepare a solution of the pressure-sensitive adhesive composition, then applying the solution onto the surface of the substrate or onto the release-treated surface of the release material according to a known coating method, and thereafter drying it to form a pressure-sensitive adhesive layer thereon, thereby producing the intended pressure-sensitive adhesive sheet.

When the pressure-sensitive adhesive layer formed on a substrate according to the above-mentioned method is stuck to another substrate, then the pressure-sensitive adhesive sheet 1b shown in FIG. 1(b) can be produced. Besides the above, the pressure-sensitive adhesive layer formed on a substrate or a release material according to the above-mentioned method may be stuck to the release-treated surface of the above-mentioned release material to produce the pressure-sensitive adhesive sheet 1c shown in FIG. 1(c) or the pressure-sensitive adhesive sheet 1d shown in FIG. 1(d).

In case where an organic solvent is added to the pressure-sensitive adhesive composition to prepare a solution of the composition, the solid concentration in the solution is preferably from 10 to 60% by mass, more preferably from 10 to 45% by mass, even more preferably from 15 to 30% by mass. When the solid concentration in the solution is at least 10% by mass, then the coatability with the solution is good. On the other hand, when at most 60% by mass, then the solution of the pressure-sensitive adhesive composition could have a suitable viscosity and could secure excellent coating workability.

The coating method may be any known coating method including, for example, a spin coating method, a spray coating method, a bar coating method, a knife coating method, a roll coating method, a blade coating method, a die coating method, a gravure coating method, etc. After the substrate or the release layer surface of the release sheet has been coated with the solution of the pressure-sensitive adhesive composition, it is desirable that the coating layer is dried by heating at a temperature of from to 150° C. for from 30 seconds to 5 minutes for preventing the solvent and low-boiling point component from remaining in the pressure-sensitive adhesive layer to be formed.

EXAMPLES

Example 1

(1) Preparation of Pressure-Sensitive Adhesive

As the rubber-based resin in the pressure-sensitive adhesive, used were 70 parts by mass (solid ratio) of PIB-based resin (A) (by BASF Ltd., product name "Oppanol B50", weight-average molecular weight 350,000) and 7 parts by mass (solid ratio) of PIB-based resin (B) (by BASF Ltd., product name "Oppanol B30", weight-average molecular weight 200,000); and as the tackifier therein, used was 23 parts by mass (solid ratio) of hydrogenated petroleum resin (by ARAKAWA CHEMICAL INDUSTRIES, LTD., product name "ARKON P-100", molecular weight 500 to 1000). These were dissolved in toluene to prepare a solution of adhesive having a solid concentration of about 25% by mass.

(2) Preparation of Pressure-Sensitive Adhesive Composition

As a photochromic dye, the dithienylethene-based compound represented by the following formula (1) (by Tokyo Chemical Industry Co., Ltd., product name "B2287") was added to the above-mentioned solution of adhesive in an amount of 2.88 parts by mass (solid ratio) relative to 100 parts by mass of the solid content of the pressure-sensitive adhesive, thereby preparing a solution of pressure-sensitive adhesive composition (solid concentration: about 25% by mass).

(3) Production of Pressure-Sensitive Adhesive Sheet

Onto a polyethylene terephthalate (PET) film (by Toray Industries, Inc., product name "Lumirror) serving as a substrate and having a thickness of 100 μm, the above-mentioned solution of pressure-sensitive adhesive composition was applied in such a manner that the thickness of the pressure-sensitive adhesive layer formed after drying could be 20 μm, and then heated at 120° C. for 2 minutes to form thereon a pressure-sensitive adhesive layer having a thickness of 20 μm. Next, the release-treated surface of a release-treated polyethylene terephthalate film (by LINTEC Corporation, product name "SP-PET380101") serving as a release sheet (release material) was stuck to the surface of the pressure-sensitive adhesive layer to produce a pressure-sensitive adhesive sheet.

[Chem. 1]

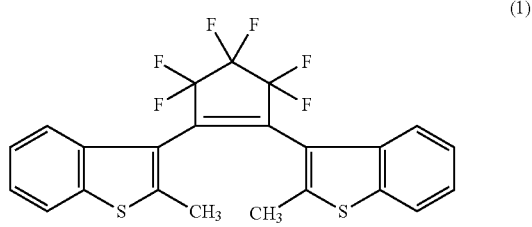

(1)

Example 2

A pressure-sensitive adhesive composition and a pressure-sensitive adhesive sheet were produced in the same manner as in Example 1, except that, relative to 100 parts by mass of the solid content of the pressure-sensitive adhesive in the pressure-sensitive adhesive composition of Example 1, 0.06 parts by mass (solid ratio) of a UV absorbent (by BASF Ltd., product name "Tinuvin 765", hindered amine-based compound) and 0.06 parts by mass (solid ratio) of an antioxidant (by BASF Ltd., product name "IRGANOX 1010") were added to the composition.

Example 3

A pressure-sensitive adhesive composition and a pressure-sensitive adhesive sheet were produced in the same manner as in Example 1, except that the amount of the dithienylethene-based compound (by Tokyo Chemical Industry Co., Ltd., product name "B2287") represented by the above-mentioned formula (1) and used as the photochromic dye in the pressure-sensitive adhesive composition of Example 1 was changed to 0.48 parts by mass (solid ratio).

Example 4

A pressure-sensitive adhesive composition and a pressure-sensitive adhesive sheet were produced in the same manner as in Example 1, except that the amount of the dithienylethene-based compound (by Tokyo Chemical Industry Co., Ltd., product name "B2287") represented by the above-mentioned formula (1) and used as the photochromic dye in the pressure-sensitive adhesive composition of Example 1 was changed to 0.96 parts by mass (solid ratio).

Example 5

A pressure-sensitive adhesive composition and a pressure-sensitive adhesive sheet were produced in the same manner as in Example 1, except that the amount of the dithienylethene-based compound (by Tokyo Chemical Industry Co., Ltd. product name "B2287") represented by the above-mentioned formula (1) and used as the photochromic dye in the pressure-sensitive adhesive composition of Example 1 was changed to 4.80 parts by mass (solid ratio).

Example 6

A pressure-sensitive adhesive composition and a pressure-sensitive adhesive sheet were produced in the same manner as in Example 1, except that the amount of the dithienylethene-based compound (by Tokyo Chemical Industry Co., Ltd., product name "B2287") represented by the above-mentioned formula (1) and used as the photochromic dye in the pressure-sensitive adhesive composition of Example 1 was changed to 6.72 parts by mass (solid ratio).

Example 7

A pressure-sensitive adhesive composition and a pressure-sensitive adhesive sheet were produced in the same manner as in Example 1, except that 100 parts by mass (solid content) of a natural rubber-based resin (NR-based resin)-containing pressure-sensitive adhesive (by LINTEC Corporation, product name "PV-2", natural rubber-based component content: 44% by mass, tackifier content: 56% by mass) was used as the pressure-sensitive adhesive in the pressure-sensitive adhesive composition of Example 1.

Comparative Example 1

A pressure-sensitive adhesive composition and a pressure-sensitive adhesive sheet were produced in the same manner as in Example 1, except that 0.96 parts by mass (solid ratio) of the spiropyran-based compound represented by the following formula (2) (by Tokyo Chemical Industry Co., Ltd., product name "T0366") was used as the photochromic dye in the pressure-sensitive adhesive composition of Example 1.

[Chem. 2]

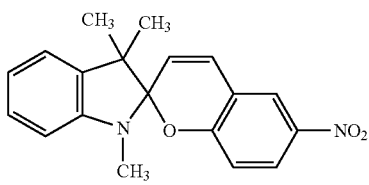

(2)

Comparative Example 2

A pressure-sensitive adhesive composition and a pressure-sensitive adhesive sheet were produced in the same manner as in Example 1, except that, relative to 100 parts by mass of the solid content of the pressure-sensitive adhesive in the pressure-sensitive adhesive composition of Comparative Example 1, 0.06 parts by mass (solid ratio) of a UV absorbent (by BASF Ltd., product name "Tinuvin 765", hindered amine-based compound) and 0.06 parts by mass (solid ratio) of an antioxidant (by BASF Ltd., product name "IRGANOX 1010") were added to the composition.

Comparative Example 3

A pressure-sensitive adhesive composition and a pressure-sensitive adhesive sheet were produced in the same manner as in Example 1, except that 2.88 parts by mass (solid ratio) of the spiropyran-based compound (by Tokyo Chemical Industry Co., Ltd., product name "T0366") represented by the above-mentioned formula (2) was added to the pressure-sensitive adhesive composition of Example 1 as the photochromic dye therein.

Comparative Example 4

A pressure-sensitive adhesive composition and a pressure-sensitive adhesive sheet were produced in the same manner as in Comparative Example 3, except that, relative to 100 parts by mass of the solid content of the pressure-sensitive adhesive in the pressure-sensitive adhesive composition of Comparative Example 3, 0.06 parts by mass (solid ratio) of a UV absorbent (by BASF Ltd., product name "Tinuvin 765", hindered amine-based compound) and 0.06 parts by mass (solid ratio) of an antioxidant (by BASF Ltd., product name "IRGANOX 1010") were added to the composition.

Comparative Example 5

A pressure-sensitive adhesive composition and a pressure-sensitive adhesive sheet were produced in the same manner as in Example 1, except that 2.88 parts by mass (solid ratio) of the oxazine-based compound represented by the following formula (3) (by Tokyo Chemical Industry Co., Ltd., product name "T1259") was used as the photochromic dye in the pressure-sensitive adhesive composition of Example 1.

[Chem. 3]

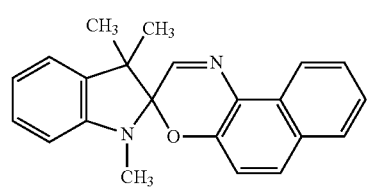

(3)

Comparative Example 6

A pressure-sensitive adhesive composition and a pressure-sensitive adhesive sheet were produced in the same manner as in Comparative Example 5, except that, relative to 100 parts by mass of the solid content of the pressure-sensitive adhesive in the pressure-sensitive adhesive composition of Comparative Example 5, 0.06 parts by mass (solid ratio) of a UV absorbent (by BASF Ltd., product name "Tinuvin 765", hindered amine-based compound) and 0.06 parts by mass (solid ratio) of an antioxidant (by BASF Ltd., product name "IRGANOX 1010") were added to the composition.

Comparative Example 7

A pressure-sensitive adhesive composition and a pressure-sensitive adhesive sheet were produced in the same manner as in Example 1, except that 2.88 parts by mass (solid ratio) of the naphthopyran-based compound represented by the following formula (4) (by Tokyo Chemical Industry Co., Ltd., product name "D3197") was used as the photochromic dye in the pressure-sensitive adhesive composition of Example 1.

[Chem. 4]

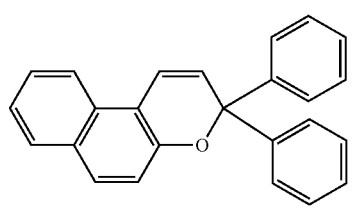

(4)

Comparative Example 8

A pressure-sensitive adhesive composition and a pressure-sensitive adhesive sheet were produced in the same manner as in Comparative Example 7, except that, relative to 100 parts by mass of the solid content of the pressure-sensitive adhesive in the pressure-sensitive adhesive composition of Comparative Example 7, 0.06 parts by mass (solid ratio) of a UV absorbent (by BASF Ltd., product name "Tinuvin 765", hindered amine-based compound) and 0.06 parts by mass (solid ratio) of an antioxidant (by BASF Ltd., product name "IRGANOX 1010") were added to the composition.

Comparative Example 9

A pressure-sensitive adhesive composition and a pressure-sensitive adhesive sheet were produced in the same manner as in Example 1, except that 2.88 parts by mass (solid ratio) of the hexaarylbisimidazole (HABI) based compound represented by the following formula (5) (by KANTO CHEMICAL CO., INC., product name "Pseudo-gem-bis(3,3',4,4'-tetramethoxydiphenylimidazole)[2.2] paracyclophane") was used as the photochromic dye in the pressure-sensitive adhesive composition of Example 1.

[Chem. 5]

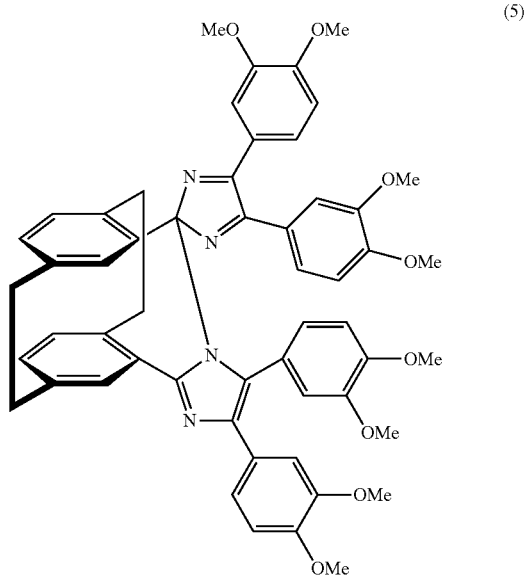

(5)

Comparative Example 10

A pressure-sensitive adhesive composition and a pressure-sensitive adhesive sheet were produced in the same manner as in Comparative Example 9, except that, relative to 100 parts by mass of the solid content of the pressure-sensitive adhesive in the pressure-sensitive adhesive composition of Comparative Example 9, 0.06 parts by mass (solid ratio) of a UV absorbent (by BASF Ltd., product name "Tinuvin 765", hindered amine-based compound) and 0.06 parts by mass (solid ratio) of an antioxidant (by BASF Ltd., product name "IRGANOX 1010") were added to the composition.

Comparative Example 11

A pressure-sensitive adhesive composition and a pressure-sensitive adhesive sheet were produced in the same manner as in Example 1, except that the amount of the dithienylethene-based compound (by Tokyo Chemical Industry Co., Ltd., product name "B2287") represented by the above-mentioned formula (1) and used as the photochromic dye in the pressure-sensitive adhesive composition of Example 1 was changed to 9.60 parts by mass (solid ratio).

Comparative Example 12

A pressure-sensitive adhesive composition and a pressure-sensitive adhesive sheet were produced in the same manner as in Example 1, except that 26 parts by mass (solid ratio) of a styrene-isoprene-styrene block copolymer rubber-based resin (SIS-based resin) (by ZEON CORPORATION, product name "Quintac 3520", styrene content: 15% by mass) as a pressure-sensitive adhesive, and 50 parts by mass (solid ratio) of an unhydrogenated petroleum resin (by ZEON CORPORATION, product name "Quinton N180"), 4 parts by mass (solid ratio) of a terpene-based resin (by YASUHARA CHEMICAL CO., LTD, product name "YS Resin LP") and 20 parts by mass (solid ratio) of a paraffin-based oil (by FUJI KOSAN COMPANY, LTD., product name "Fukkol Process P-100") all serving as a tackifier were mixed and these components were dissolved in toluene to prepare a pressure-sensitive adhesive solution having a solid concentration of about 25% by mass, and 100 parts by mass (solid content) of the thus-prepared adhesive was used in the pressure-sensitive adhesive composition of Example 1.

Comparative Example 13

A pressure-sensitive adhesive composition and a pressure-sensitive adhesive sheet were produced in the same manner as in Example 1, except that an acrylic-based copolymer of butyl acrylate (BA) and acrylic acid (AA) (BA/AA=91.0/9.0 (% by mass), weight-average molecular weight 800,000, solid concentration 34% by mass) was used as the pressure-sensitive adhesive in the pressure-sensitive adhesive composition of Example 1, and relative to 100 parts by mass of the solid content of the pressure-sensitive adhesive, 2.21 parts by mass (solid ratio) of a tolylene diisocyanate based crosslinking agent (by Nippon Polyurethane Industry Co., Ltd., product name "Coronate L", solid concentration 75% by mass) was used as the crosslinking agent and 2.88 parts by mass (solid ratio) of the dithienylethene-based compound represented by the above-mentioned formula (1) (by Tokyo Chemical Industry Co., Ltd., product name "B2287") was used as the photochromic dye.

Comparative Example 14

A pressure-sensitive adhesive composition and a pressure-sensitive adhesive sheet were produced in the same manner as in Comparative Example 13, except that the amount of the dithienylethene-based compound represented by the above-mentioned formula (1) (by Tokyo Chemical Industry Co., Ltd., product name "B2287") and used as the photochromic dye in the pressure-sensitive adhesive composition in Comparative Example 13 was changed to 0.96 parts by mass (solid ratio).

Comparative Example 15

A pressure-sensitive adhesive composition and a pressure-sensitive adhesive sheet were produced in the same manner as in Example 1, except that an acrylic-based copolymer of butyl acrylate (BA) and acrylic acid (AA)

(BA/AA=94.0/6.0 (% by mass), weight-average molecular weight 800,000, solid concentration 34% by mass) was used as the pressure-sensitive adhesive in the pressure-sensitive adhesive composition of Example 1, and relative to 100 parts by mass of the solid content of the pressure-sensitive adhesive, 2.21 parts by mass (solid ratio) of a tolylene diisocyanate crosslinking agent (by Nippon Polyurethane Industry Co., Ltd., product name "Coronate L", solid concentration 75% by mass) was used as the crosslinking agent and 0.96 parts by mass (solid ratio) of the dithienylethene-based compound represented by the above-mentioned formula (1) (by Tokyo Chemical Industry Co., Ltd., product name "B2287") was used as the photochromic dye.

Comparative Example 16

A pressure-sensitive adhesive composition and a pressure-sensitive adhesive sheet were produced in the same manner as in Comparative Example 15, except that an acrylic-based copolymer of butyl acrylate (BA) and acrylic acid (AA) (BA/AA=96.0/4.0 (% by mass), weight-average molecular weight 800,000, solid concentration 34% by mass) was used as the pressure-sensitive adhesive in the pressure-sensitive adhesive composition of Comparative Example 15.

Comparative Example 17

A pressure-sensitive adhesive composition and a pressure-sensitive adhesive sheet were produced in the same manner as in Example 1, except that an acrylic-based copolymer of butyl acrylate (BA), isobutyl acrylate (iBA), vinyl acetate (VAc), 2-hydroxyethyl methacrylate (HEMA) and methacrylic acid (MAA) (BA/iBA/VAc/HEMA/MAA 44.0/44.0/5.76/6.20/0.04 (% by mass), weight-average molecular weight 800,000, solid concentration 37% by mass) was used as the pressure-sensitive adhesive in the pressure-sensitive adhesive composition of Example 1, and relative to 100 parts by mass of the solid content of the pressure-sensitive adhesive, 0.39 parts by mass (solid ratio) of a hexamethylene diisocyanate crosslinking agent (by Nippon Polyurethane Industry Co., Ltd., product name "Coronate HL", solid concentration 75% by mass) was used as the crosslinking agent and 2.88 parts by mass (solid ratio) of the spiropyran-based compound represented by the above-mentioned formula (2) (by Tokyo Chemical Industry Co., Ltd., product name "T0366") was used as the photochromic dye.

Comparative Example 18

A pressure-sensitive adhesive composition and a pressure-sensitive adhesive sheet were produced in the same manner as in Comparative Example 17, except that the amount of the spiropyran-based compound represented by the above-mentioned formula (3) (by Tokyo Chemical Industry Co., Ltd., product name "T1259") and used as the photochromic dye in the pressure-sensitive adhesive composition of Comparative Example 17 was changed to 0.96 parts by mass (solid ratio).

Comparative Example 19

A pressure-sensitive adhesive composition and a pressure-sensitive adhesive sheet were produced in the same manner as in Example 1, except that an acrylic-based copolymer of butyl acrylate (BA), ethyl acrylate (EA), vinyl acetate (VAc) and acrylamide (AAm) (BA/EA/VAc/AAm=54.0/27.0/17.0/2.0 (% by mass), weight-average molecular weight 1,000,000, solid concentration 24.6% by mass) was used as the pressure-sensitive adhesive in the pressure-sensitive adhesive composition of Example 1, and relative to 100 parts by mass of the solid content of the pressure-sensitive adhesive, 3.05 parts by mass (solid ratio) of a tolylene diisocyanate crosslinking agent (by Nippon Polyurethane Industry Co., Ltd., product name "Coronate L", solid concentration 75% by mass) was used as the crosslinking agent and 2.88 parts by mass (solid ratio) of the spiropyran-based compound represented by the above-mentioned formula (3) (by Tokyo Chemical Industry Co., Ltd., product name "T0366") was used as the photochromic dye.

Comparative Example 20

A pressure-sensitive adhesive composition and a pressure-sensitive adhesive sheet were produced in the same manner as in Comparative Example 19, except that the amount of the spiropyran-based compound represented by the above-mentioned formula (3) (by Tokyo Chemical Industry Co., Ltd., product name "T1259") and used as the photochromic dye in the pressure-sensitive adhesive composition of Comparative Example 19 was changed to 0.96 parts by mass (solid ratio).

The evaluation methods for the pressure-sensitive adhesive sheets obtained in the manner as above are as follows. The evaluation results are shown in Table 1 and Table 2.

(1) Evaluation of Appearance

The pressure-sensitive adhesive sheet obtained in Examples and Comparative Examples was cut into a size of 20 mm×20 mm, the release sheet was removed, and the exposed adhesive surface was stuck to a glass plate (by NSG PRECISION Co., Ltd., product name "Corning Glass Eagle XG", 150 mm×70 mm×2 mm) using a squeegee to prepare a sample for appearance evaluation.

First, in a state not irradiated with UV rays, the evaluation sample was visually checked for discoloration according to the criteria mentioned below. The evaluation result is given to the column of "Just after Production" of "Appearance" in Tables 1 and 2.

Further, using a light resistance tester (by Suga Test Instruments Co., Ltd., product name "UV Fadeometer U48", light source: carbon arc lamp (hereinafter this may be referred to as "FOM")), the evaluation sample was irradiated for 75 hours, and the evaluation sample was visually checked for discoloration according to the criteria mentioned below. The evaluation result is given to the column of "FOM 75h" of "Appearance" in Tables 1 and 2.

(Evaluation Criteria for Appearance)

A: With no discoloration, the sample was kept colorless.

B: The sample was somewhat discolored in pale color of pale yellow, pale red, pale brown or the like.

C: The sample was clearly discolored in yellow, red, brown or the like.

D: The pressure-sensitive adhesive layer of the sample whitened.

(2) Evaluation of Long-Term Weather Resistance

The appearance evaluation sample prepared in the manner as above was irradiated with UV ray (wavelength 365 nm) for 5 seconds, using a UV irradiation device (by AS ONE Corporation, product name "Handy UV Lamp SLUV-4"), and the thus-irradiated evaluation sample was visually checked for discoloration according to the criteria mentioned below. The evaluation result is given to the column of "Just after Production" of "Long-Term Weather Resistance" in Tables 1 and 2.

Further, using a light resistance tester (by Suga Test Instruments Co., Ltd., product name "UV Fadeometer U48", light source: carbon arc lamp), the evaluation sample was irradiated for 25 hours, to 50 hours and 75 hours, and the thus-irradiated evaluation samples were checked similarly. The evaluation result is given to the columns of "FOM 25h", "FOM 50h" and "FOM 75h" of "Long-Term Weather Resistance" in Tables 1 and 2.

(Evaluation Criteria for Long-Term Weather Resistance)
  A: Discolored.
  F: Not discolored (no change).

(3) Evaluation of Time for Restoration to Colorless

The appearance evaluation sample prepared in the manner as above was irradiated with UV ray (wavelength 365 nm) for 5 seconds, using a UV irradiation device (by AS ONE Corporation, product name "Handy UV Lamp SLUV-4"), and the time taken to restore the thus-irradiated evaluation sample to a colorless state was measured. Based on the thus-measured time, the sample was evaluated according to the criteria mentioned below.
  A: Restored to colorless in shorter than 20 minutes.
  F: Not restored to colorless in 20 minutes or more.

(4) Evaluation of Peelability to Release Sheet

In peeling the release sheet from the pressure-sensitive adhesive sheet obtained in Examples and Comparative Examples, the adhesive sheet was checked for the possibility of peeling the release sheet according to the criteria mentioned below.
  A: Peelable.
  F: Difficult to peel, owing to heavy peeling.

TABLE 1

| Components (part by mass(*1)) | Pressure-Sensitive Adhesive | | | UV Absorbent | Antioxidant | Photochromic Dye | | | | |
|---|---|---|---|---|---|---|---|---|---|---|
| | Rubber-based Resin | | | | | | | | Naphtho- | |
| | PIB-based Resin | NR-based Resin | SIS-based Resin | Tinuvin 765 | IRGANOX 1010 | Diarylethene B2287 | Spiropyran T0366 | Oxazine T1259 | pyran D3197 | HABI |
| Example 1 | 100 | — | — | — | — | 2.88 | — | — | — | — |
| Example 2 | 100 | — | — | 0.06 | 0.06 | 2.88 | — | — | — | — |
| Example 3 | 100 | — | — | — | — | 0.48 | — | — | — | — |
| Example 4 | 100 | — | — | — | — | 0.96 | — | — | — | — |
| Example 5 | 100 | — | — | — | — | 4.80 | — | — | — | — |
| Example 6 | 100 | — | — | — | — | 672 | — | — | — | — |
| Example 7 | — | 100 | — | — | — | 2.88 | — | — | — | — |
| Comparative Example 1 | 100 | — | — | — | — | — | 0.96 | — | — | — |
| Comparative Example 2 | 100 | — | — | 0.06 | 0.06 | — | 0.96 | — | — | — |
| Comparative Example 3 | 100 | — | — | — | — | — | 2.88 | — | — | — |
| Comparative Example 4 | 100 | — | — | 0.06 | 0.06 | — | 2.88 | — | — | — |
| Comparative Example 5 | 100 | — | — | — | — | — | — | 2.88 | — | — |
| Comparative Example 6 | 100 | — | — | 0.06 | 0.06 | — | — | 2.88 | — | — |
| Comparative Example 7 | 100 | — | — | — | — | — | — | — | 2.88 | — |
| Comparative Example 8 | 100 | — | — | 0.06 | 0.06 | — | — | — | 2.88 | — |
| Comparative Example 9 | 100 | — | — | — | — | — | — | — | — | 2.88 |
| Comparative Example 10 | 100 | — | — | 0.06 | 0.06 | — | — | — | — | 2.88 |
| Comparative Example 11 | 100 | — | — | — | — | 9.60 | — | — | — | — |
| Comparative Example 12 | — | — | 100 | — | — | 2.88 | — | — | — | — |

| | Evaluation Items | | | | | | | |
|---|---|---|---|---|---|---|---|---|
| | Appearance | | Long-Term Weather Resistance | | | | Time for | Peelability |
| | Just after Production | FOM 75 h | Just after Production | FOM 25 h | FOM 50 h | FOM 75 h | Restoration to Colorless | to Release Sheet |
| Example 1 | A | A | A | A | A | A | A | A |
| Example 2 | A | B | A | A | A | A | A | A |
| Example 3 | A | A | A | A | A | A | A | A |
| Example 4 | A | A | A | A | A | A | A | A |
| Example 5 | A | A | A | A | A | A | A | A |
| Example 6 | A | A | A | A | A | A | A | A |
| Example 7 | A | A | A | A | A | A | A | A |
| Comparative Example 1 | A | B | A | F | F | F | F | A |
| Comparative Example 2 | A | B | A | F | F | F | F | A |
| Comparative Example 3 | B | C | A | F | F | F | F | A |
| Comparative Example 4 | B | C | A | F | F | F | F | A |
| Comparative Example 5 | A | C | A | A | A | A | A | A |
| Comparative Example 6 | A | C | A | A | A | A | A | A |
| Comparative Example 7 | A | B | A | A | A | F | A | F |
| Comparative Example 8 | D | D | A | A | A | F | A | F |
| Comparative Example 9 | D (*2) | (*2) | (*2) | (*2) | (*2) | (*2) | (*2) | (*2) |
| Comparative Example 10 | D | D | A | F | F | F | A | A |
| Comparative Example 11 | D | D | F | F | F | F | F | A |
| Comparative Example 12 | A | C | A | F | F | F | A | A |

(*1)The numerical value in Table indicates the solid ratio to 100 parts by mass of the solid content of the pressure-sensitive adhesive.

(*2) Just after production of the pressure-sensitive adhesive sheet, the pressure-sensitive adhesive layer whitened and the solid deposited, and the sample was confirmed not to be transparent. Consequently, the test was stopped without any other evaluation.

TABLE 2

| Components (part by mass(*1)) | Pressure-Sensitive Adhesive Acrylic-based Copolymer Compositional Ratio (% by mass) | Amount | Crosslinking Agent Coronate L/ Coronate HL | UV Absorbent Tinuvin 765 | Antioxidant IRGANOX 1010 | Photochromic Dye Diarylethene B2287 | Photochromic Dye Spiropyran T0366 |
|---|---|---|---|---|---|---|---|
| Comparative Example 13 | BA/AA = 91.0/9.0 | 100 | 2.21 | — | — | 2.88 | — |
| Comparative Example 14 | BA/AA = 91.0/9.0 | 100 | 2.21 | — | — | 0.96 | — |
| Comparative Example 15 | BA/AA = 94.0/6.0 | 100 | 2.21 | — | — | 0.96 | — |
| Comparative Example 16 | BA/AA = 96.0/4.0 | 100 | 2.21 | — | — | 0.96 | — |
| Comparative Example 17 | BA/iBA/VAc/HEMA/MAA = 44.0/44.0/5.76/6.20/0.04 | 100 | 0.39 | — | — | — | 2.88 |
| Comparative Example 18 | BA/iBA/VAc/HEMA/MAA = 44.0/44.0/5.76/6.20/0.04 | 100 | 0.39 | — | — | — | 0.96 |
| Comparative Example 19 | BA/EA/VAc/AAm = 54.0/27.0/17.0/2.0 | 100 | 3.05 | — | — | — | 2.88 |
| Comparative Example 20 | BA/EA/VAc/AAm = 54.0/27.0/17.0/2.0 | 100 | 3.05 | — | — | — | 0.96 |

| | Evaluation Items | | | | | | |
|---|---|---|---|---|---|---|---|
| | Appearance | | Long-Term Weather Resistance | | | | Time for | Peelability |
| | Just after Production | FOM 75 h | Just after Production | FOM 25 h | FOM 50 h | FOM 75 h | Restoration to Colorless | to Release Sheet |
| Comparative Example 13 | A | B | A | A | F | F | A | A |
| Comparative Example 14 | A | B | A | A | F | F | A | A |
| Comparative Example 15 | A | B | A | A | A | F | A | A |
| Comparative Example 16 | A | B | A | A | A | F | A | A |
| Comparative Example 17 | B | C | A | F | F | F | F | F |
| Comparative Example 18 | B | B | A | F | F | F | F | F |
| Comparative Example 19 | B | C | A | F | F | F | F | F |
| Comparative Example 20 | B | B | A | F | F | F | F | F |

(*1) The numerical value in Table indicates the solid ratio to 100 parts by mass of the solid content of the pressure-sensitive adhesive.

Even after irradiation with UV rays for 75 hours, Examples 1 to 7 did not discolor and their appearance was good, their photochromic performance did not worsen and their weather resistance was good. Further, the time taken to restore the samples to colorless was shorter than 20 minutes, from which, it is known that the rate of color change from colored to colorless of those samples is high. No problem occurred in peeling from the release sheet.

On the other hand, Comparative Examples 1 to 20 were not good in point of any of the appearance, the long-term weather resistance, the time for restoration to colorless and the peelability to release sheet, as shown in Table 1.

Just after production of the pressure-sensitive adhesive sheet of Comparative Example 9, the pressure-sensitive adhesive layer therein whitened and the solid deposited, and the sample was confirmed not to be transparent, and consequently, the test was stopped without any other evaluation.

INDUSTRIAL APPLICABILITY

The pressure-sensitive adhesive composition and the pressure-sensitive adhesive sheet of the present invention have excellent weather resistance that can withstand long-term use, a relatively rapid rate of color change from colored to colorless, and excellent peelability to release sheets.

Therefore, the pressure-sensitive adhesive composition and the pressure-sensitive adhesive sheet of the present invention are favorable for use for color sheets which, for the purpose of controlling the light permeability therethrough, are to be stuck to glass plates or transparent resin plates for windowpanes, wall surfaces, partitions, or to glass plates or transparent resin plates for illuminations to be used in space exposed to black light irradiation.

REFERENCE SIGNS LIST 1a, 1b, 1c, 1d Pressure-Sensitive Adhesive Sheet
11, 11' Substrate
12 Pressure-Sensitive Adhesive Layer
13, 13' Release Material

The invention claimed is:

1. A pressure-sensitive adhesive composition comprising a pressure-sensitive adhesive that comprises:
   from 40 to 95% by mass of a rubber-based resin not comprising a styrene-derived constituent unit; and
   a photochromic dye of a dithienylethene-based compound,
   wherein a content of the photochromic dye is from 0.40 to 8.00 parts by mass relative to 100 parts by mass of the pressure-sensitive adhesive,
   wherein the rubber-based resin comprises a polyisobutylene-based resin in which a content of the polyisobutylene-based resin is from 60 to 100% by mass in the rubber-based resin, and
   wherein the rubber-based resin comprises a polyisobutylene-based resin having a weight average molecular weight of 300,000 to 500,000 as PIB-based resin (A) and a polyisobutylene-based resin having a weight average molecular weight of 1,000 to 280,000 as PIB-based resin (B).

2. The pressure-sensitive adhesive composition according to claim 1, wherein the dithienylethene-based compound is a compound having two aryl groups, a hexafluorocyclopentene group, or both, in a structure of one molecule.

3. The pressure-sensitive adhesive composition according to claim 1, wherein the pressure-sensitive adhesive further comprises a tackifier and a content of the tackifier is from 5 to 60% by mass in all components of the pressure-sensitive adhesive.

4. A pressure-sensitive adhesive sheet having a pressure-sensitive adhesive layer formed of the pressure-sensitive adhesive composition according to claim 1.

5. The pressure-sensitive adhesive composition according to claim 1, wherein the dithienylethene-based compound comprises two aryl groups and one or more hexafluorocyclopentene groups in the structure of one molecule.

6. The pressure-sensitive adhesive composition according to claim 1, wherein the dithienylethene-based compound comprises two benzothienyl groups and one or more hexafluorocyclopentene groups in the structure of one molecule.

7. The pressure-sensitive adhesive composition according to claim 1, wherein the rubber-based resin comprises a polyisobutylene-based resin in which a content of the polyisobutylene-based resin is from 95 to 100% by mass in the rubber-based resin.

8. The pressure-sensitive adhesive composition according to claim 1, wherein the rubber-based resin comprises a polyisobutylene-based resin in which a content of the polyisobutylene-based resin is substantially 100% by mass in the rubber-based resin.

9. The pressure-sensitive adhesive composition according to claim 1, wherein the content of the rubber-based resin is from 65 to 85% by mass relative to all the components of the pressure-sensitive adhesive composition.

10. The pressure-sensitive adhesive composition according to claim 1, wherein the pressure-sensitive adhesive further comprises a tackifier in which a content of the tackifier is from 15 to 35% by mass relative to all the components of the pressure-sensitive adhesive composition.

11. The pressure-sensitive adhesive composition according to claim 3, wherein the tackifier is a hydrogenated petroleum resin.

12. The pressure-sensitive adhesive composition according to claim 1, wherein the content of PIB-based resin (B) is from 2 to 100 parts by mass relative to 100 parts by mass of PIB-based resin (A).

13. The pressure-sensitive adhesive sheet according to claim 4, wherein the sheet is colorless or pale color after 75 hours irradiation with a light of a carbon arc lamp.

14. The pressure-sensitive adhesive sheet according to claim 4, wherein the sheet discolors by 5 seconds irradiation with UV ray having a wavelength of 365 nm after 75 hours irradiation with a light of a carbon arc lamp.

* * * * *